Jan. 22, 1935.　　　　　H. E. STUMP　　　　　1,988,524
METHOD OF OBTAINING MAGNESIUM CARBONATE
Filed Aug. 20, 1931
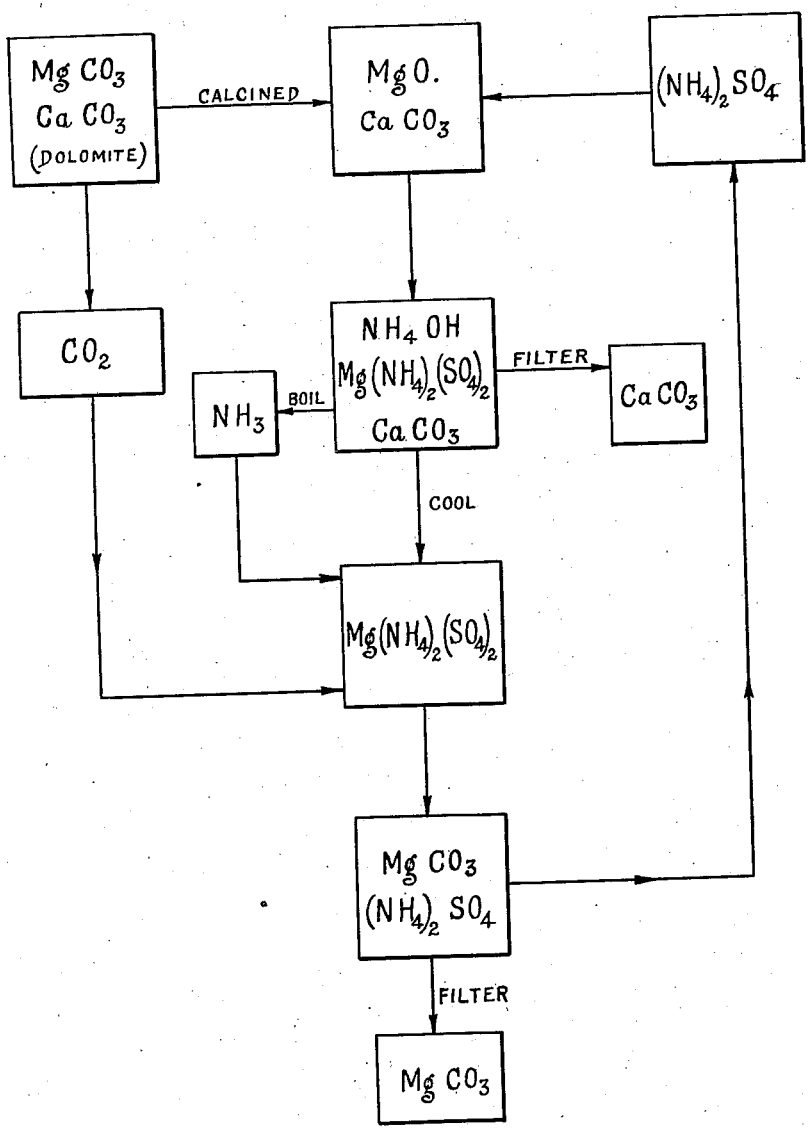
WITNESS
INVENTOR
HORACE E. STUMP
BY
ATTORNEYS Patented Jan. 22, 1935

1,988,524

UNITED STATES PATENT OFFICE 1,988,524

METHOD OF OBTAINING MAGNESIUM CARBONATE

Horace E. Stump, Lakeville, Conn.

Application August 20, 1931, Serial No. 558,331

2 Claims. (Cl. 23—67)

My invention relates to separating magnesium, preferably in the form of magnesium carbonate, from a mixture of magnesium oxide and calcium carbonate, and especially such a mixture as may readily be obtained by burning a mixture of magnesium carbonate and calcium carbonate as found in nature, for instance in the mineral dolomite. Such a mixture of magnesium oxide and calcium carbonate may be obtained in a number of ways, among them being the following:

(1) Convert the dolomite into magnesium oxide and calcium carbonate by burning the same at a temperature below that at which the calcium carbonate is decomposed.

(2) Burn large blocks of dolomite in the ordinary process of manufacturing quicklime, for instance by the ordinary lime kiln process, the magnesium carbonate being converted into magnesium oxide and carbonic acid gas and the calcium carbonate being converted into calcium oxide and carbonic acid gas. At the end of the process there will usually remain in the centre of each block what is known as a "core", i. e. a mass of incompletely burned stone consisting mainly of magnesium oxide and calcium carbonate.

(3) Remove the magnesium oxide and the calcium oxide as produced in (2) from the "core" material, form a suspension of such oxides in water, thus incidentally slaking the calcium oxide, pass $CO_2$ (waste product of the dolomite burning) into the suspension, thus converting the calcium hydrate into calcium carbonate, and stop the reaction before the magnesium oxide is attacked by the carbon dioxide.

(4) Grind all of the material, including the "core" obtained in (2) and treat it as described in (3); the $CO_2$ does not affect the ground "core" material. This method avoids the necessity involved in (2) and in (3) of separating the "cores" from the oxides which cling thereto.

(5) Convert the dolomite by prolonged burning into magnesium oxide and calcium oxide, leaving substantially no "core", i. e. no calcium carbonate, and then treat the mixture as in (3), thus converting the calcium oxide into calcium carbonate while leaving the magnesium oxide unchanged.

Of the above methods for preparing a mixture of magnesium oxide and calcium carbonate I prefer (1) as this necessitates the use of less fuel.

My improved preferred method of treating a mixture of magnesium oxide and calcium carbonate may be carried out as follows, reference being had to the accompanying drawing illustrating graphically the several steps of the process:

(a) Add a solution of ammonium sulfate to a suspension of magnesium oxide and calcium carbonate in water. The magnesium oxide is converted into magnesium ammonium sulfate while the calcium carbonate remains unchanged. The sulfate passes into solution while the calcium carbonate remains in suspension.

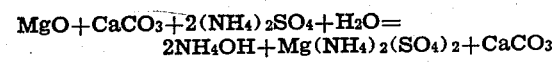

(b) Boil the solution to drive off $NH_3$, preferably collecting such gas.

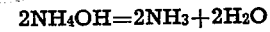

(c) Filter to remove the calcium carbonate.

(d) Cool the filtrate (magnesium ammonium sulfate solution). I have found that a temperature of about 80° C. is most advantageous for the precipitating step which follows.

(e) Pass $NH_3$ (preferably that obtained from step (b), into the cooled filtrate.

(f) Pass $CO_2$ (preferably in the form of lime kiln gases) into the filtrate.

The steps (e) and (f) may be performed simultaneously.

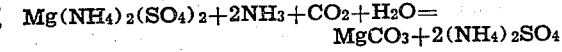

The magnesium carbonate (insoluble) is then separated from the ammonium sulfate (in solution) and the latter is ready for re-use in step (a), thus making my process a cyclic one.

In my novel process the step (c) may be taken at any time after step (a) and before step (f).

I may omit steps (b), (d) and (e) altogether, as I can obtain the indicated reactions without driving off $NH_3$ and then returning it. I find, however, that the presence of the $NH_3$ retards or blocks the reaction to a substantial extent. Therefore, as I boil off $NH_3$, step (b), I make it possible for the reaction (a) to take place much more completely and thus increase the yield.

I may obtain magnesium carbonate by my method, but have the reaction take a somewhat different course, by having present in step (a) a large excess of magnesium oxide and boiling the mixture to drive off the $NH_3$ as it is formed, thus obtaining not magnesium ammonium sulfate, but magnesium sulfate.

I may then convert the magnesium sulfate partially into magnesium ammonium sulfate and partially into magnesium hydrate, by returning the ammonia to the solution after the latter has been cooled.

$$2MgSO_4 + 2NH_4OH = Mg(OH)_2 + Mg(NH_4)_2(SO_4)_2.$$

By now passing in the $CO_2$, I obtain $MgCO_3$ and one or more basic carbonates of magnesia, for instance, $4MgCO_3Mg(OH)_2.5H_2O$, by proper control of the concentrations. As indicated under (f) hereinabove, the steps of passing $NH_3$ and $CO_2$ into the sulfate solution may be performed simultaneously.

The resulting mixture of carbonates may, for many purposes, be employed in the same manner as magnesium carbonate alone.

The magnesium carbonate may be dried and marketed as such, may be calcined and marketed as magnesium oxide, or the carbonate or oxide may be converted into other magnesium compounds.

In place of ammonium sulfate I may use some other readily soluble ammonium salt whose corresponding magnesium salt, as in the case of the sulfate, is soluble while the corresponding calcium salt is relatively insoluble, and all of these are suitable for use in a cyclic process, i. e. the ammonia and the acid radical used in step (a) are recovered in the form of the ammonium salt at the end of step (f). I prefer, however, to use ammonium sulfate because if any free calcium oxide should be present this will be converted into calcium sulfate which can readily be separated with the calcium carbonate. By the use of ammonium sulfate, therefore, I obtain a product which is much more nearly completely free of calcium than one obtained with the use of an ammonium salt whose corresponding calcium salt is soluble, as in the latter case substantial quantities of calcium would be brought into solution.

The relative insolubilities of calcium salts in a solution treated with ammonium sulfate as compared with a solution treated with ammonium chloride are shown by the following:

On page 341, Vol. VII, International Critical Tables, is a table of the solubility of calcium sulphate in Epsom salt solutions. This shows a maximum solubility of .01208 mols $CaSO_4$ in a solution of 1.077 mols Epsom salt in 1000 grams of water at 25°. This drops off very rapidly until a concentration of 3.114 mols Epsom salt in 1000 grams water is reached, when the solubility of $CaSO_4$ reaches .00388 mols. Translated, this means that the maximum solubility of $CaSO_4$ is 1.45 grams in a litre of 11.4% Epsom salt solution or a ratio of one calcium to 89 magnesium. The minimum solubility is .53 grams in a litre of saturated Epsom salt or a ratio of one calcium to 800 magnesium.

On pages 309-310, Vol. IV is a table of the solubility of calcium chloride-magnesium chloride, and a phase rule diagram of this table is on page 386, Fig. 64, of the same volume. This shows the complex relationship existing in this system and the possibility of having almost any ratio of calcium to magnesium in chloride solutions.

The following experiment shows the relative action of ammonium chloride and ammonium sulphate on partially calcined dolomite.

22.4 grams of $(NH_4)_2SO_4$ were added to 25 grams of partially calcined dolomite containing 27.3% MgO. This is the molecular equivalent of the MgO. To another 25 grams of the same core were added 18.1 grams of $NH_4Cl$ or the molecular equivalent of the chloride solution. 100 cc of water was added to each and then they were boiled to expel the ammonia. Both samples were treated as nearly alike as possible and run at the same time. Boiling was continued for half an hour, water being added from time to time to replace that lost by evaporation. It was particularly noteworthy that the chloride treated material behaved very badly, and foamed so as to make it difficult to manage. This was not true of the sulphate treated material.

At the end of the half hour both samples were filtered and 20 cc samples taken for analysis. The results were as follows:

|  | CaO | MgO | Ratio CaO:MgO |
|---|---|---|---|
|  | Grams | Grams |  |
| Chloride treated | .115 | 1.050 | 1:9.1 |
| Sulphate treated | .00912 | 1.054 | 1:116 | or about 12.5 times as much soluble calcium in the chloride treated material as in the sulphate treated filtrate.

Especially if conducted in close proximity to the kiln in which the mineral (dolomite) is converted into magnesium oxide and calcium carbonate, my cyclic process is a very inexpensive one as the $CO_2$ is ordinarily a waste product of the burning and there is very little loss of ammonium sulfate.

When I refer in my specification and claims to magnesium carbonate, it will, of course, be understood by any chemist that, insofar as concerns the normal carbonate $MgCO_3$ (which is found in nature) this is not obtained in pure form by precipitation, only hydrated basic carbonates being formed by precipitation and their composition varying with the conditions, and that any reference to $MgCO_3$ must be understood in this sense. (Smith, General Chemistry for Colleges, 2nd Ed., p. 526.)

I claim:
1. The process of separating magnesium in the form of magnesium carbonate from dolomite, which comprises partially calcining dolomite to form a mixture of magnesium oxide and calcium carbonate, treating such mixture with a solution of ammonium sulfate to dissolve the magnesium oxide, boiling off the ammonia from the resulting mixture, separating the calcium carbonate, adding ammonia and the carbonic acid gas obtained from the calcination of the dolomite in any order to the remaining solution, separating the precipitated magnesium carbonate, and treating further quantities of the mixture of magnesium oxide and calcium carbonate with the ammonium salt liquor.

2. The process of separating magnesia in the form of magnesium carbonate from a mixture of magnesium oxide and calcium carbonate which comprises treating such mixture with a solution of ammonium sulfate to dissolve the magnesium oxide, boiling off ammonia from the resulting mixture and separating the calcium carbonate, adding carbonic acid gas and ammonia to the remaining solution, separating the precipitated magnesium carbonate, and treating further quantities of the mixture of magnesium oxide and calcium carbonate with the ammonium sulfate liquor.

HORACE E. STUMP.